June 9, 1925. 1,540,939
H. C. HANSEN
MACHINE FOR THE MANUFACTURE OF FENCING
Filed April 1, 1925 2 Sheets-Sheet 1
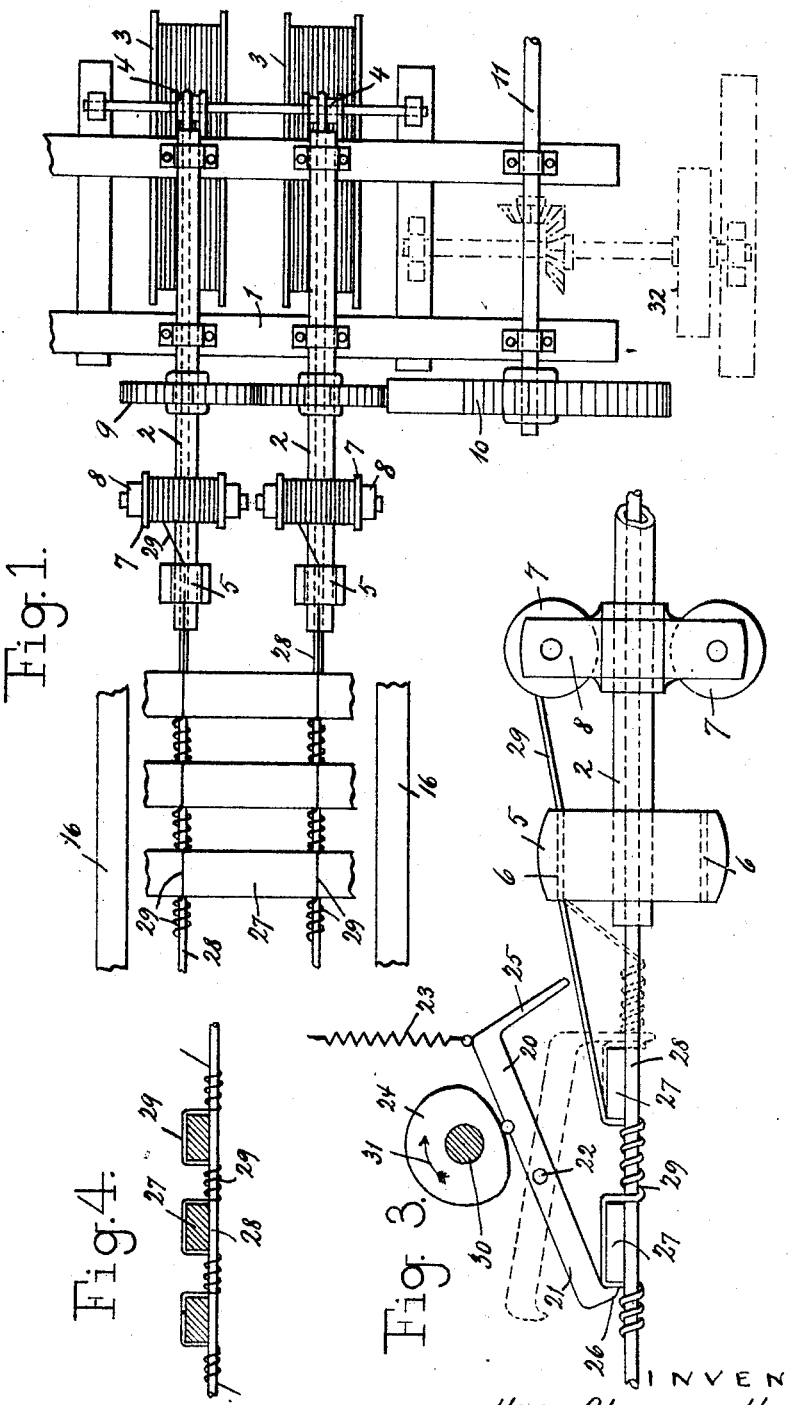

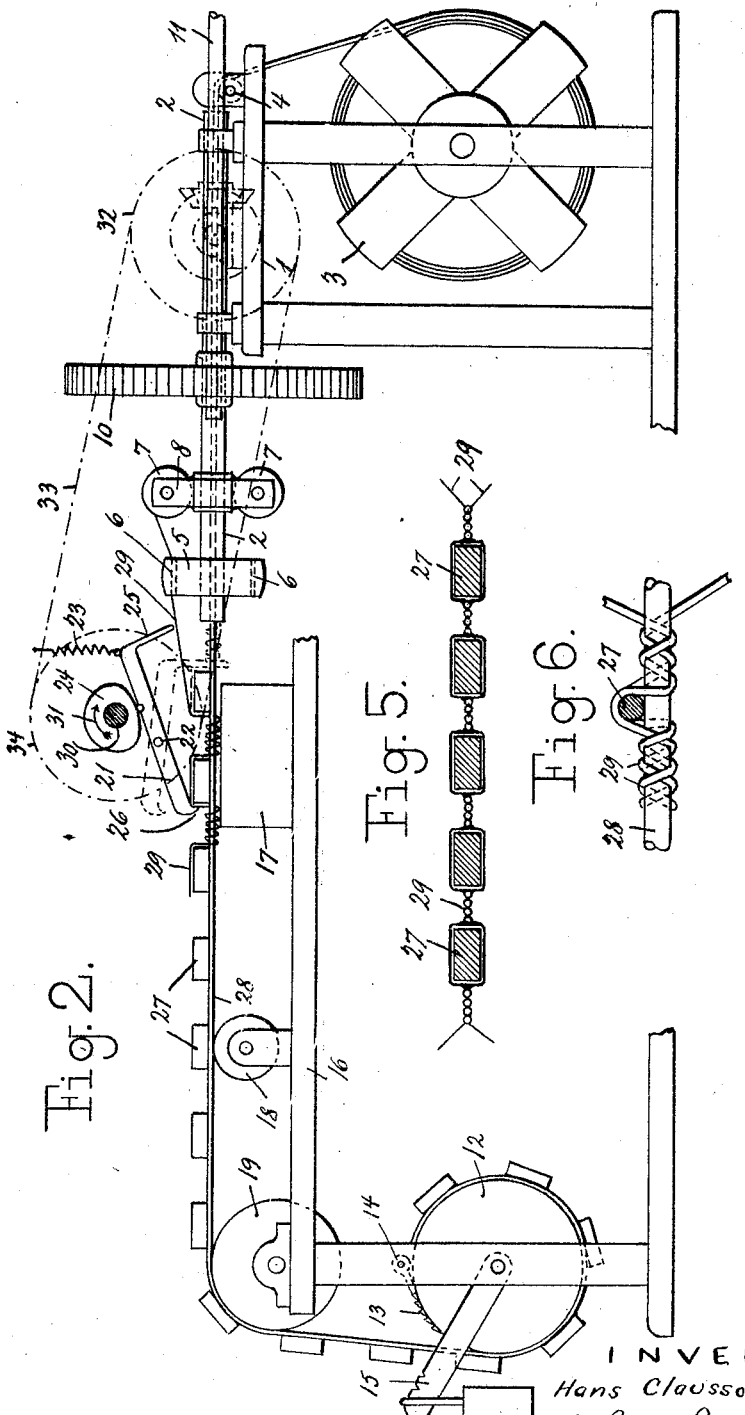

Patented June 9, 1925.

1,540,939

UNITED STATES PATENT OFFICE.

HANS CLAUSSON HANSEN, OF CHARLOTTENLUND, NEAR COPENHAGEN, DENMARK.

MACHINE FOR THE MANUFACTURE OF FENCING.

Application filed April 1, 1925. Serial No. 19,919.

*To all whom it may concern:*

Be it known that I, HANS CLAUSSON HANSEN, merchant, a subject of the King of Denmark, residing at Charlottenlund, near Copenhagen, in the Kingdom of Denmark, have invented new and useful Improvements in Machines for the Manufacture of Fencing, of which the following is a specification.

This invention has relation to machines employed in the manufacture of fencing consisting of staves of chestnut or the like bound together side by side by two or more rows of wire, each row of wire consisting of two strands, the one a supporting wire and the other a binding wire, or two binding wires, the wires being coiled the one on the other or twisted together between adjacent staves. A machine for the manufacture of such fencing and to which the present invention relates comprises a frame in which hollow parallel shafts are mounted, said shafts carrying reel carriers and guide members and being adapted to be rotated intermittently. The binding wire is on reels mounted in the reel carriers and the supporting wire passes through the hollow shafts, the wires being coiled the one on the other or twisted together around the staves by rotation of the shafts.

A machine of the kind described for the manufacture of fencing as referred to, is provided, in accordance with this invention, with means to tension and hold the binding wire immediately before and during the coiling or twisting of the wire.

In order that the invention may be clearly and readily understood, reference will now be made to the constructional embodiment illustrated on the accompanying drawing, on which:—

Fig. 1 is a plan view of the right-hand end of the machine;

Figs. 2 and 3 are side views and together show the complete machine; and

Figs. 4 to 6 inclusive are cross-sectional views of products of the machine.

2, 2 are horizontally disposed hollow shafts rotatably mounted parallel to one another on the machine frame 1. Wire carrying drums 3 are also mounted in the machine frame 1, each drum 3 being disposed below, and at right hand end of, a shaft 2. 4, 4 are guide rollers, each disposed above a drum 3 and in line with a shaft 2. 5, 5 are guide members and 8, 8 are reel carriers fixedly mounted on the shafts 2 with the guide members 5 disposed in front of the reel carriers and at the extreme left hand ends of the shafts 2. The reel carriers 8, 8 are arranged each to carry two reels 7 of wire, hereafter called binding wire 29, and the guide members 5 each have two holes 6 through each of which binding wire 29 from a reel 7 is passed and guided. The wire 28 wound on the drums 3 is of heavier gauge than the binding wire 29 and is hereafter called supporting wire. The supporting wire 28 from a drum 3 is led over the superposed roller 4 to and through a shaft 2. The shafts 2 are driven by spur wheels 9 which are mounted thereon and are in mesh. The spur wheels 9 are in turn driven by a spur wheel 10 mounted on a shaft 11 driven by an electric or other motor. The spur wheel 10 meshes with only one of the spur wheels 9 and is greater in diameter than the spur wheels 9 which are consequently geared up. In the constructional embodiment now being described, the gearing 10, 9 is as 1 to 5, but the spur wheels 9 do not, however, make five revolutions to each revolution of the spur wheel 10, but only four. This is due to the fact that the spur wheel 10 is a mutilated wheel and comes out of mesh with the spur wheel 9 during a part of each revolution. A drum 12 is mounted at the left hand end of the machine frame 1. The completed product is wound on to this drum which carries a ratchet wheel 13 that is engaged by a part 14 mounted on the machine frame 1. The drum 12 is thus held against rotation except in one direction and rotation in this direction is assisted in known manner by a weighted lever 15. 17 is a block mounted on the side members 16 of the machine frame 1. These side members 16 also carry guide rollers 18, 19 and above them is mounted a wire-tensioning and holding device. This consists of a lever 20, 21 of the first order mounted on a spindle 22 and acted upon in opposition by a spring 23 and a cam 24. The cam 24 is mounted on a shaft 30 which is driven by means of the belt-drive 32, 33, 34, Fig. 2, so that the cam rotates in the direction indicated by the arrow 31. The lever 20, 21 is provided with a hook 26 at one end and the other end with an arm 25, the free end of which is bifurcated so that it can partly embrace the binding wire 28. A second wire tensioning and holding device may also be provided and be mounted below that described and shown, so that it acts oppositely thereto.

The operation of the machine is as follows:—

If it is intended to manufacture fencing as shown in Fig. 4, the supporting wire 28 is first led from the drums 3 over the rollers 4, through the hollow shafts 2 and over the guide rollers 18, 19 to the drums 12 to which the free ends are attached. The binding wire 29 is then led from the reels 7 through the holes 6 of the guide members 5 and attached to the supporting wire 28. The driving motor is now set in motion, the cam 24 is rotated and acts on the lever 20, 21, the arm 25 is pressed down on to the binding wires 29 which are thus held. The rotation of the shaft 11 drives the shafts 2 and with them the reels 7 and guide members 5. The shafts 2 make four revolutions and as a consequence the binding wires 29 are each wrapped four times round the supporting wires 28. The cam 24 comes out of action, the lever 20, 21 is operated by the spring 23 and the arm 25 raised out of contact with the wire on the supporting wires 28 under the binding wires 29 and behind the portions of binding wire 29 that have been coiled on the supporting wires 28. The drum 12 is now rotated to bring the stave 27 to a position at which the arm 25 can act on and hold the binding wires 29 against the supporting wire 28. The binding wire 29 is again coiled around the supporting wire 28, after which another stave 27 is inserted in position under the binding wires 29. The staves 27 are placed in position when the shafts 2 are at rest. The means for feeding the supporting wires 28 is not shown as any suitable arrangement may be employed for the purpose. The hook 26 of the two-armed lever 20, 21 contacts with the staves 27 and control the feed of the supporting wires 28.

In the product illustrated in Fig. 5 supporting wires 28 are not employed, but two binding wires 29 are used. Such a manner of binding the staves is known, but, in the present method herein described, the fastening is more secure, especially if two wire tensioning and holding devices are employed, the one above and the other below the binding wires 29.

Fig. 6 shows a product in which iron rods 27 are employed in lieu of staves and such product is particularly applicable in reinforced concrete work. In the manufacture of this product, it is advantageous to employ two binding wires 29 and these when coiled on the supporting wire 28 cross one another. The term "fencing" is intended to cover a product such as shown in Fig. 6.

Having thus described my invention, what I claim is:—

A machine for the manufacture of trellis-like fencing material and wire-bound iron reinforcement for concrete, comprising a machine frame, a plurality of parallel hollow shafts journaled thereon and forming passages for supporting wires, a binding-wire guiding device mounted on each of the said shafts and having means for wrapping the binding-wires around the supporting wires and binding staves to the same, an automatically operated tension device located above the supporting wires and consisting of a spring-actuated lever fulcrumed intermediate of its ends to form two arms, one of the arms being provided at its outer end with means for engaging the staves to control the feed and the other arm having wire engaging means arranged to engage the bind wire and press it firmly against a transverse stave resting on the supporting wire while the binding wire is being wrapped around the supporting wire, a cam located above the lever and arranged to directly engage one of the arms thereof for moving the lever against the action of the spring, and a single means for operating the cam to disengage the feed controlling means and move the wire engaging means into contact with the binding wire and for rotating the hollow shafts while the binding wire is being pressed against the stave.

In testimony whereof I have signed my name to this specification.

HANS CLAUSSON HANSEN.

Witnesses:
F. ENGELHARDT-MADSEN,
V. BELSCHNER.